United States Patent [19]

Hawkins et al.

[11] Patent Number: 5,443,283
[45] Date of Patent: Aug. 22, 1995

[54] SUSPENSION SYSTEM

[75] Inventors: Gerald M. Hawkins, Moundsville, W. Va.; Carl H. Kutay, McMurray, Pa.

[73] Assignee: Consol Inc., Library, Pa.

[21] Appl. No.: 206,699

[22] Filed: Mar. 7, 1994

[51] Int. Cl.6 .............................................. B60G 11/26
[52] U.S. Cl. .................... 280/709; 280/714; 280/DIG. 1
[58] Field of Search .................. 280/709, 714, DIG. 1

[56] References Cited

U.S. PATENT DOCUMENTS 5,016,909  5/1991  Lin ........................................ 280/709
5,116,077  5/1992  Karnopp et al. ..................... 280/714

Primary Examiner—Kenneth R. Rice
Attorney, Agent, or Firm—Alan N. McCartney

[57] ABSTRACT

A hydraulic suspension system for a multi-wheeled vehicle where each wheel is supported a suspension arm pivoted to the vehicle body and a hydraulic system including a cylinder positioned between the arm and the vehicle body to support the body on the wheels. The hydraulic system for each wheel functions independently of the hydraulic system of other wheels to maintain a near constant vehicle ground clearance.

4 Claims, 4 Drawing Sheets

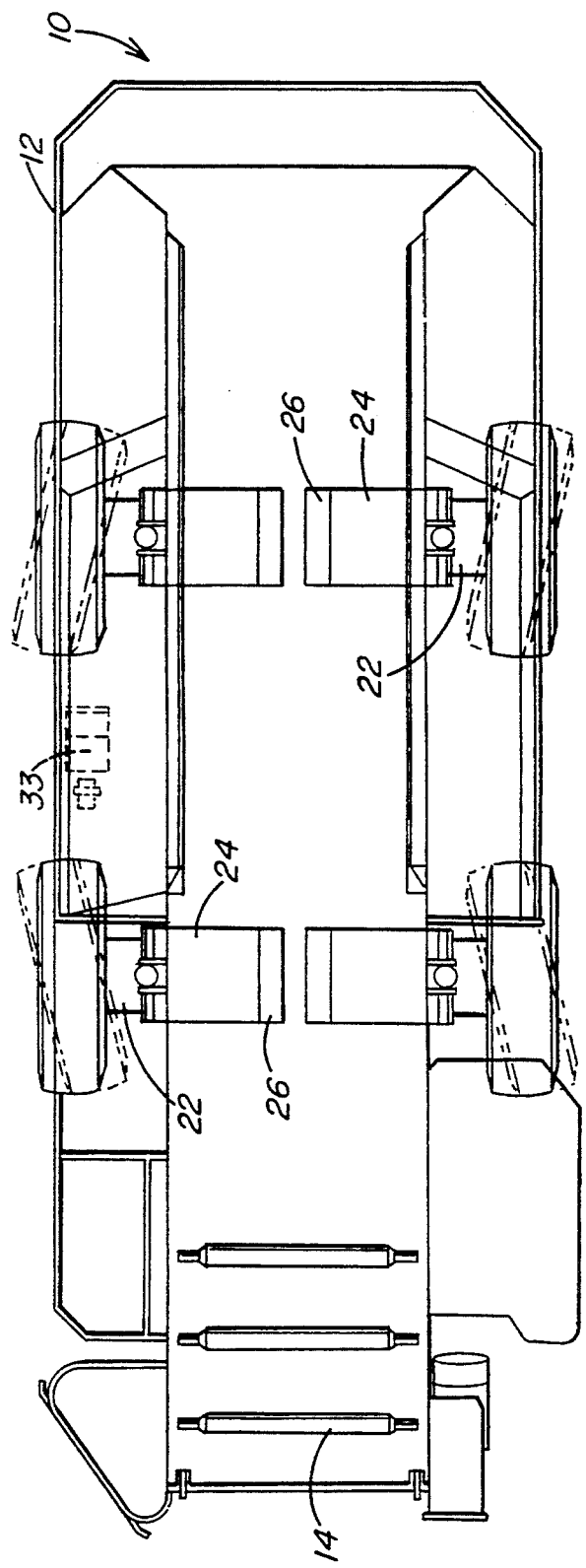
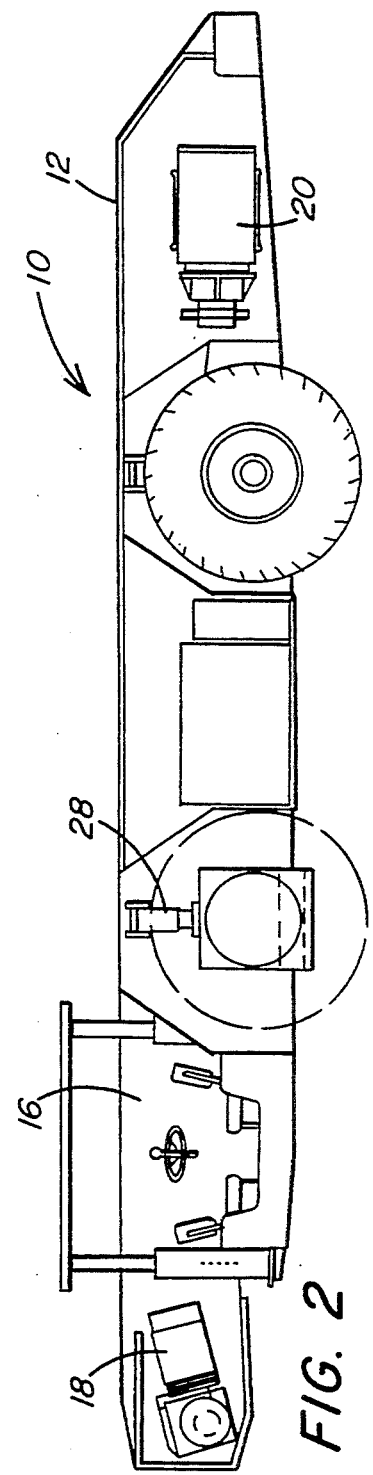

SUSPENSION SYSTEM

BACKGROUND OF THE INVENTION

FIELD ON THE INVENTION

This invention relates to a four wheel independent suspension system for load handling vehicles wherein each wheel is carried on a pivoting suspension arm equipped with a hydraulic cylinder, displacement-actuated hydraulic valve, and hydraulic accumulator.

SUMMARY OF THE PRIOR ART

Hydraulic suspension systems are known in the art wherein one wheel's suspension system responds to conditions encountered by another wheel's suspension system. For example, U.S. Pat. Nos. 3,357,512 and 4,371,182 disclose suspension systems where each wheels suspension system interacts with the suspension system of another wheel. U.S. Pat. Nos. 5,062,660; 5,076,606, and 5,085,459 likewise disclose interacting wheel suspension systems. U.K. Pat. No. 1,384,454 discloses a suspension system having a pivoted wheel suspension arm positioned by a hydraulic cylinder in-line with an accumulator with a suspension arm actuated hydraulic valve in-line with the hydraulic suspension of another wheel so one wheel influences another.

SUMMARY OF THE INVENTION

It is the purpose of this invention to provide a four wheel suspension system where each wheel is pivoted on a suspension arm positioned with respect to the vehicle body by a hydraulic cylinder pressurized by an accumulator in response to wheel position. A control valve responsive to suspension arm position is in line between the hydraulic cylinder and another accumulator to permit the hydraulic cylinder to be charged or discharged in response to the wheel position.

Vehicles such as shuttle cars for transporting coal vary considerably from empty to loaded weight and with variance in load weight distribution to the wheels and roadbed undulations on the transport surface, it is desirable to have each vehicle wheel suspension controlled in response to wheel position (i.e., load weight on the wheel or transport surface) so that the vehicle body or chassis ground clearance remains constant. This independent suspension system provides better vehicle operator ride and greater vehicle and roadway life.

BRIEF DESCRIPTION OF THE DRAWINGS

FIG. 1 illustrates a side view of a shuttle car for transporting mined coal;

FIG. 2 is a top plane view of shuttle car;

DESCRIPTION OF THE PREFERRED EMBODIMENT

Figure 3:
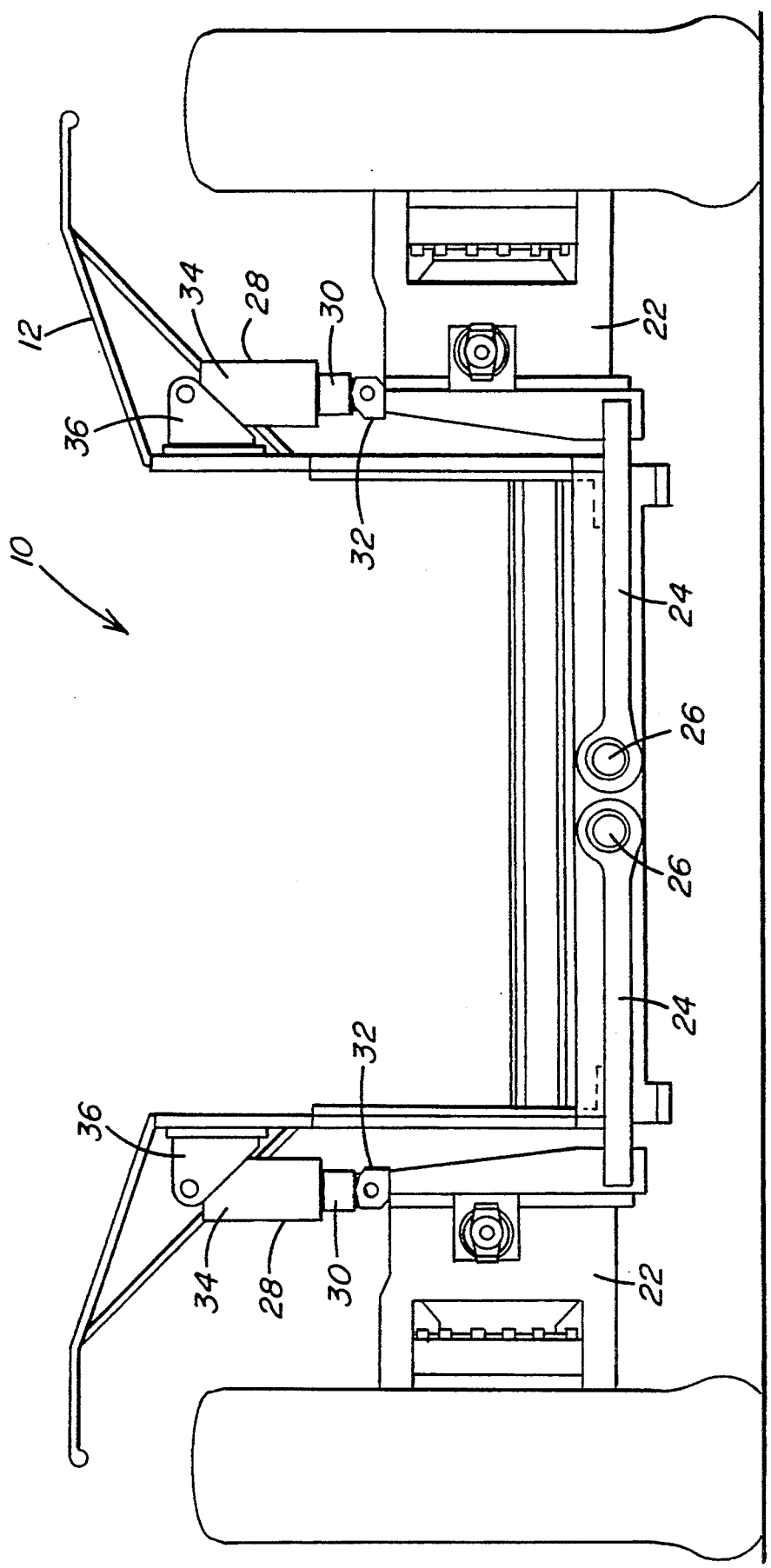
FIG. 3 is an end view of the shuttle car.
Figure 4:
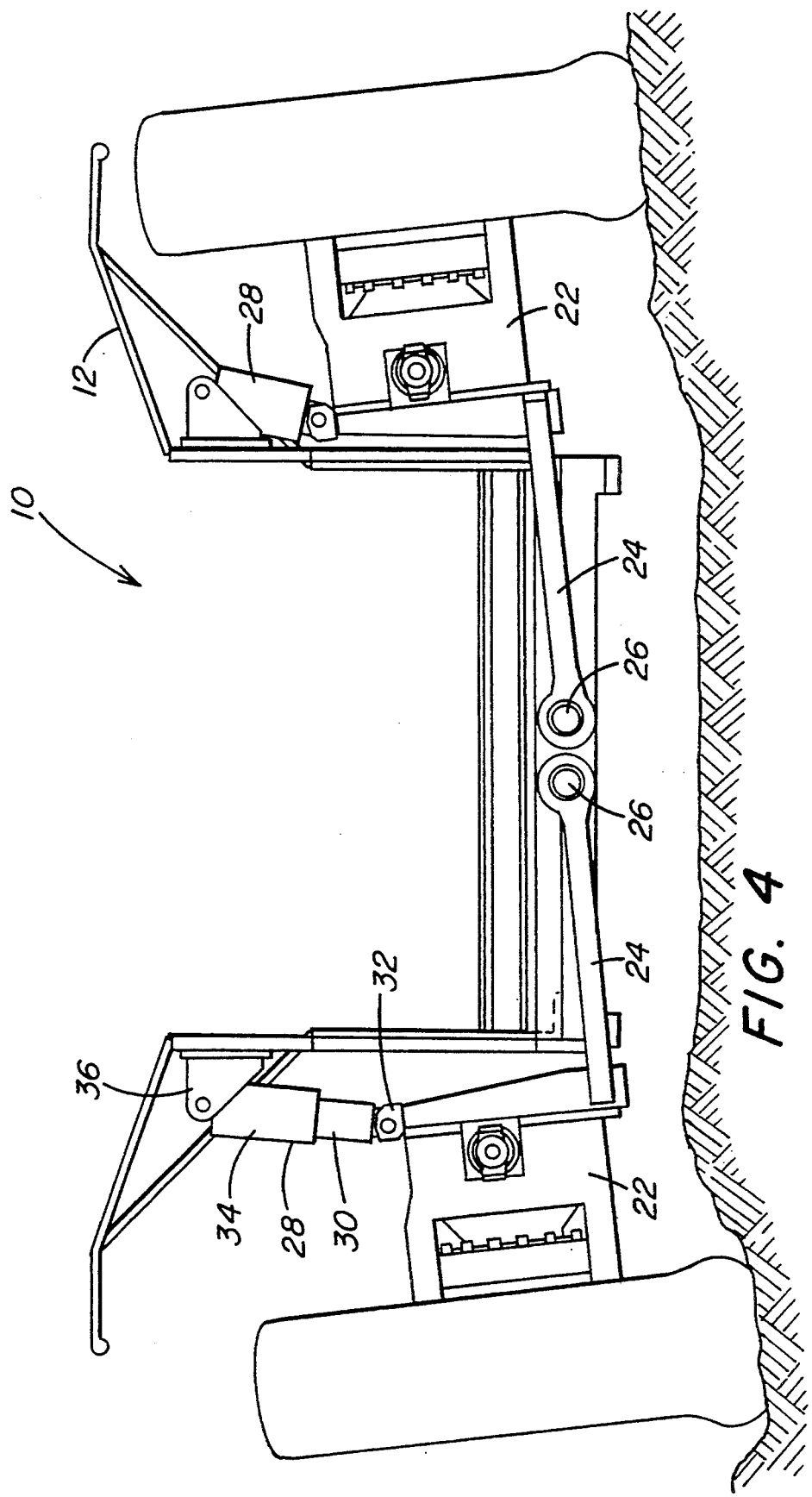
FIG. 4 is an end view of the shuttle car illustrating the suspension system maintaining a constant ground clearance with varying working surfaces and varying carrying weights.

FIGS. 1 to 4 illustrate a shuttle car using the hydraulic suspension system of this invention.

It should be appreciated the hydraulic suspension system of this invention can be used on other vehicles wherein it is desirable to maintain the vehicle body clearance with a transport surface constant while maintaining transport surface integrity and improving operator ergonomics.

The shuttle car 10 is generally illustrated in FIGS. 1 to 4 and has a body portion 12 onto which coal is transported by a conveyor 14. Operator compartment 16 is located on the side of the car along with the tram power unit 20 for the car and power unit 18 for the conveyor. The hydraulic power unit 33 supplies oil to the suspension system. The four wheel assemblies 22 are each independently steerable (see FIG. 2). Each wheel assembly has a suspension arm 24 pivoted to the body 12 at 26. Attached between each wheel assembly 22 and the body 12 is a hydraulic cylinder 28. The piston 30 of each cylinder 28 is carried on bracket 32 on the wheel assembly 22 with the cylinder body 34 being attached to the bracket 36 on body 12. It can thus be seen that the hydraulic cylinders 28 support the weight of the vehicle body 12 from the suspension arms 24 on wheel assemblies 22.

Figure 5:
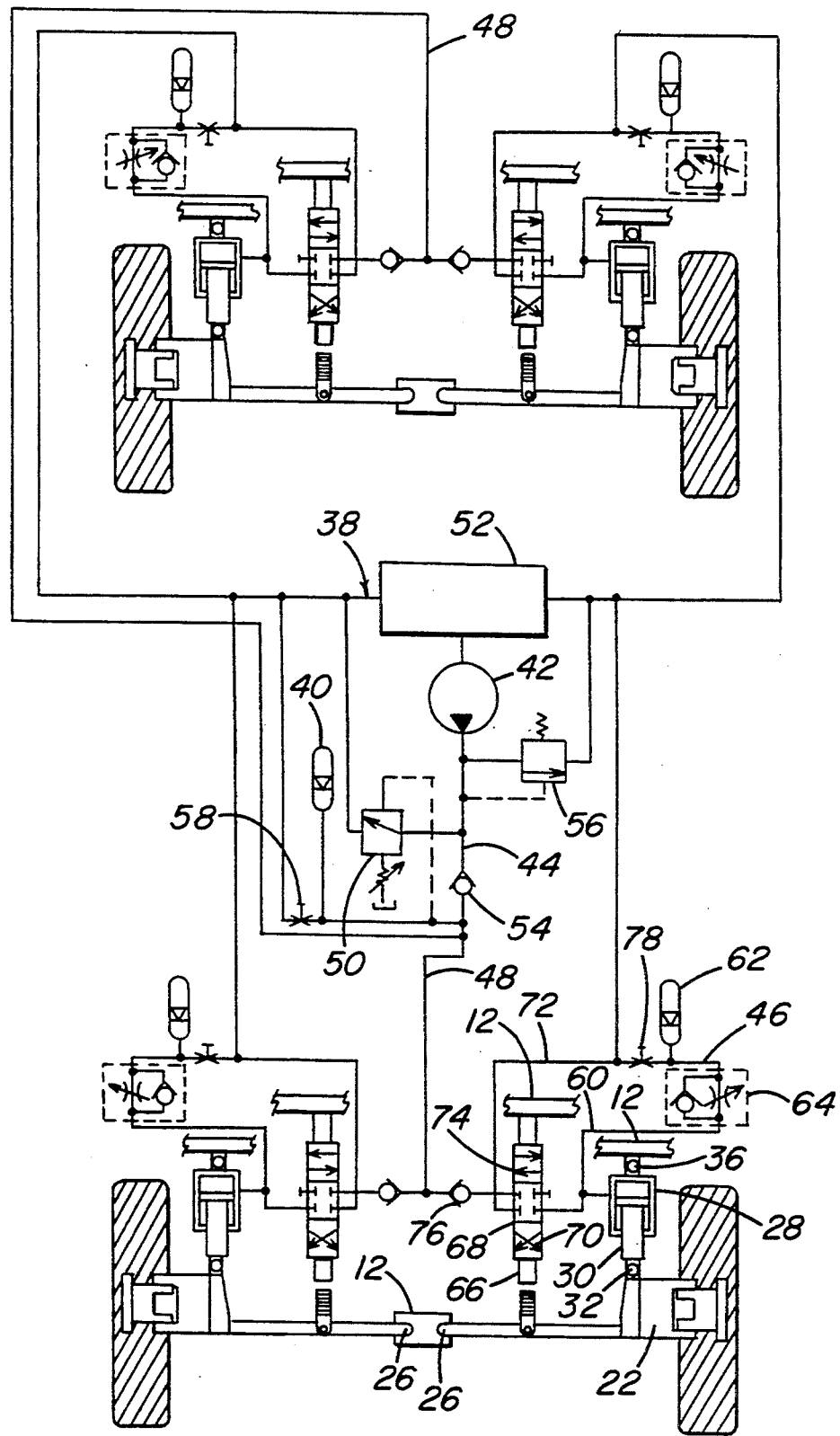
FIG. 5 is a diagrammatic illustration of the hydraulic suspension system.

Attention is now directed to FIG. 5 which diagrammatically illustrates the primary hydraulic system 38 controlling the cylinders 28 to maintain the body portion 12 level with the transport surface regardless of load weight or load weight distribution. The hydraulic system 38 supplies pressurized fluid to the hydraulic cylinders 28.

The hydraulic system 38 is an accumulator type where accumulator 40 is used to receive and store pressurized fluid from pump 42 through line 44 and supply pressurized fluid to wheel assembly hydraulic systems 46 through lines 48. The flow of pressurized fluid to accumulator 40 is controlled by unloading valve 50 operative at a preselected pressure value to bypass fluid to the tank 52. Back flow out of the accumulator 40 is prevented by check valve 54. The pumps hydraulic pressure 38 is limited from over-pressurization by relief valve 56. For safety and maintenance purposes, a bleed-off valve 58 can be opened to discharge the pressurized fluid stored in accumulator 40.

The tire loads from roadbed or transport surface undulations to maintain the body 12 level (see FIG. 4) are controlled by a secondary accumulator type hydraulic system 46 controlling each wheel assembly 22. Each system on each wheel assembly is identical (see FIG. 5) and contains an accumulator 62 dampening the action of hydraulic cylinder 28 (accumulator 62 functions to provide shock absorption and accumulator 40 functions to provide oil for load leveling). Hydraulic oil is transferred from cylinder 28 to the accumulator 62 through a restrictor valve 64. The restrictor valve 64 is designed to allow restricted hydraulic oil flow into the accumulator and unrestricted flow out of the accumulator 62 to the hydraulic cylinder 28. In this fashion, upward pivotal movement of the suspension arm 24 will be dampened and downward pivotal movement of the suspension arm 24 will be unrestricted.

The weight of the vehicle varies from its empty weight to maximum loaded weight depending on its rated material carrying capacity. The vehicle is designed for a known maximum total weight. In order to maintain a near constant vehicle ground clearance with varying vehicle weight, a control linkage 66 is positioned between the pivotal suspension arm 24 and vehicle body 12 (see FIG. 5). The control linkage 66 has a control valve 68. The control linkage is designed to allow a range of suspension arm movement before sufficient force is developed to shift the control valve (Rexroth Control Valve). The control valve is centered and all ports are blocked when the correct ground clearance is achieved. If the ground clearance is either lower or higher than a predetermined working range, the control valve is shifted to allow hydraulic oil to enter or exit the hydraulic cylinder 28. As shown, for example, in lower right wheel assembly in FIG. 5, as the vehicle would be loaded and the set point for movement of control valve 68 is exceeded, the lines 48 and 60 would be connected through valve port 70 to supply pressurized fluid from accumulator 40 to cylinder 28. As the vehicle is unloaded, lines 60 and line 72 back to tank 52 can be connected through valve port 74 to depressurize cylinder 28 to maintain constant ground clearance. With each wheel assembly being independently operable and not influenced by the other wheel assembly positions, the vehicle ground clearance is maintained near constant regardless of vehicle weight distribution or roadbed changes.

An isolation check valve 76 is placed in the hydraulic pressure supply to the control valve to prevent hydraulic pressure spikes from severe tire shock loading to reach the hydraulic supply system or the suspension system of other wheel assemblies being controlled from the same hydraulic pressure system.

For safety and maintenance purposes, a bleed-off valve 78 is provided to discharge the hydraulic fluid in the pressurized accumulator 62.

We claim:

1. A hydraulic suspension system for a multi-wheeled vehicle adapted to be subjected to variable weight loading and roadbed conditions comprising;

a) a vehicle body portion
   b) wheel assemblies independently pivotally suspended from said body portion;
   c) a hydraulic cylinder positioned between each of said wheel assemblies and said body portion, said hydraulic cylinders supporting said body portion on said wheel assemblies;
   d) a hydraulic system for supplying pressurized fluid to each of said hydraulic cylinders;

2. The hydraulic suspension system of claim 1 including a hydraulic system for each of said wheel assembles, each wheel assembly hydraulic system being independently operable and disassociated from the function of other wheel assembly hydraulic systems.

3. The hydraulic suspension system of claim 1 wherein said hydraulic system is an accumulator type.

4. The hydraulic suspension system of claim 2 wherein said wheel assembly hydraulic systems are an accumulator type.

e) control linkage on each wheel assembly including a control valve interposed between said hydraulic system and each of said hydraulic cylinders, each control valve being responsive to movement of said control linkage in response to variable weight loading on a wheel assembly to supply pressurized fluid to said hydraulic cylinder or depressurize said hydraulic cylinder; and
   f) each of said hydraulic cylinders being independently operable and dissociated from the function of other hydraulic cylinders so each wheel assembly is independently operable to main constant vehicle body-roadbed clearance in response to variable weight loading on the wheel assemblies.

* * * * *

UNITED STATES PATENT AND TRADEMARK OFFICE
CERTIFICATE OF CORRECTION

PATENT NO. : 5,443,283  
DATED : August 22, 1995  
INVENTOR(S) : Gerald M. Hawkins, Carl H. Kutay It is certified that error appears in the above-indentified patent and that said Letters Patent is hereby corrected as shown below:

Col. 4, Lines 1 to 33 should read a) a vehicle body portion
b) wheel assemblies independently pivotally suspended from said body portion;
c) a hydraulic cylinder positioned between each of said wheel assemblies and said body portion, said hydraulic cylinders supporting said body portion on said wheel assemblies;
d) a hydraulic system for supplying pressurized fluid to each of said hydraulic cylinders;
e) control linkage on each wheel assembly including a control valve interposed between said hydraulic system and each of said hydraulic cylinders, each control valve being responsive to movement of said control linkage in response to variable weight loading on a wheel assembly to supply pressurized fluid to said hydraulic cylinder or depressurize said hydraulic cylinder; and
f) each of said hydraulic cylinders being independently operable and dissociated from the function of other hydraulic cylinders so each wheel assembly is independently operable to main constant vehicle body-roadbed clearance in response to variable weight loading on the wheel assemblies.

UNITED STATES PATENT AND TRADEMARK OFFICE
CERTIFICATE OF CORRECTION

PATENT NO. : 5,443,283

DATED : August 22, 1995

INVENTOR(S) : Gerald M. Hawkins, Carl H. Kutay

It is certified that error appears in the above-indentified patent and that said Letters Patent is hereby corrected as shown below:

cont.

2. The hydraulic suspension system of claim 1 including a hydraulic system for each of said wheel assembles, each wheel assembly hydraulic system being independently operable and disassociated from the function of other wheel assembly hydraulic systems.

3. The hydraulic suspension system of claim 1 wherein said hydraulic system is an accumulator type.

4. The hydraulic suspension system of claim 2 wherein said wheel assembly hydraulic systems are an accumulator type.

Signed and Sealed this

Twenty-fourth Day of October, 1995

Attest:

BRUCE LEHMAN

Attesting Officer

Commissioner of Patents and Trademarks